United States Patent
Champion et al.

(10) Patent No.: US 7,033,694 B2
(45) Date of Patent: Apr. 25, 2006

(54) THREADED FUEL CELL ASSEMBLY

(75) Inventors: David Champion, Lebanon, OR (US);
Dennis Lazaroff, Corvallis, OR (US);
Peter Mardilovich, Corvallis, OR (US);
Gregory S Herman, Albany, OR (US);
James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 10/410,635

(22) Filed: Apr. 7, 2003

(65) Prior Publication Data
US 2004/0197634 A1    Oct. 7, 2004

(51) Int. Cl.
*H01M 8/02* (2006.01)
*H01M 2/08* (2006.01)

(52) U.S. Cl. .......................... 429/34; 429/35
(58) Field of Classification Search .............. 429/34, 429/35, 38, 39
See application file for complete search history.

(56) References Cited

U.S. PATENT DOCUMENTS

| | | | | |
|---|---|---|---|---|
| 5,944,661 A | * | 8/1999 | Swette et al. | 600/345 |
| 6,042,960 A | * | 3/2000 | DaCosta et al. | 429/53 |
| 6,045,237 A | * | 4/2000 | Parsons et al. | 362/205 |
| 6,684,948 B1 | * | 2/2004 | Savage | 166/248 |
| 2005/0069752 A1 | * | 3/2005 | Tiquet et al. | 429/40 |

FOREIGN PATENT DOCUMENTS

JP    2000-90956    *    3/2000

* cited by examiner

*Primary Examiner*—Stephen J. Kalafut

(57) ABSTRACT

Various embodiments of the invention are directed toward a fuel cell assembly comprising a fuel cell casing and one or more fuel cell elements comprised of electrode and electrolyte material. The fuel cell casing is configured with threads and the fuel cell elements can be threadingly engaged in the fuel cell casing.

24 Claims, 3 Drawing Sheets

THREADED FUEL CELL ASSEMBLY

BACKGROUND

1. Field of the Invention

The present invention relates generally to fuel cells.

2. Background Information

A fuel cell is an energy device that generates electricity and heat by electrochemically combining a gaseous fuel and an oxidizing gas using an ion conducting electrolyte. A fuel cell's primary reaction involves the transportation of oxygen ions through the electrolyte from a cathode material to an anode material. As fuel (usually hydrogen $H_2$ or methane $CH_4$) arrives at the anode, the fuel may react with oxygen ions from the electrolyte, forming, inter alia, water and releasing electrons (e-) to an external circuit. Problems may arise if leakage occurs of the reactants or products. Thus, the performance of a fuel cell may depend at least partially on obtaining gas and liquid seals around the electrode materials.

Various sealing mechanisms are useful for preventing system leakage, (e.g., glass seals, gasket seals or other compression type seals). However, fuel cells may experience high temperatures and vibrations during operation that can either damage the seals or cause the seals to become ineffective. In addition, the complexity of compression type seals may inhibit rapid assembly. The subject matter described below may address one or more of these issues.

BRIEF SUMMARY

In accordance with various embodiments of the invention, a fuel cell assembly may comprise a fuel cell casing and one or more fuel cell elements having outer edges and comprising electrode and electrolyte material. The fuel cell casing is configured with threads and the fuel cell elements may threadingly engage in the fuel cell casing.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to components by different names. This document does not intend to distinguish between components that differ in name but not function.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention may include a fuel cell assembly comprising a fuel cell casing configured with threads and one or more fuel cell elements that engage in the casing. Each fuel cell element may have an outer edge that corresponds to the threads of the fuel cell casing. As such, the outer edge of a fuel cell element may threadingly engage the threads of the fuel cell casing. The fuel cell elements may have a disc configuration although other configurations are acceptable as well. The combination of fuel cell elements may form a fuel cell "stack" mountable in the fuel cell casing. Other embodiments may include additional components including, but not limited to, spacers that may be positioned between two adjacent fuel cell elements, as well as other components. The spacers may be comprised of Au, an Au alloy or some other material that is chemically inert under the conditions present in the fuel cell and provides a low resistance electrical connection. The spacers may serve, inter alia, two basic purposes; to provide and maintain a space between fuel cell elements and to provide electrical connection between elements.

The subject matter described herein may have application in multiple types of fuel cell and other systems. For the sake of clarity and illustration, an embodiment of the invention will be discussed with respect to a particular application, i.e., solid oxide fuel cells. However, it should be appreciated that references to this particular application are meant solely for purposes of illustration, and should not be used to limit the disclosure, including the claims, in any way unless otherwise indicated.

Figure 1:
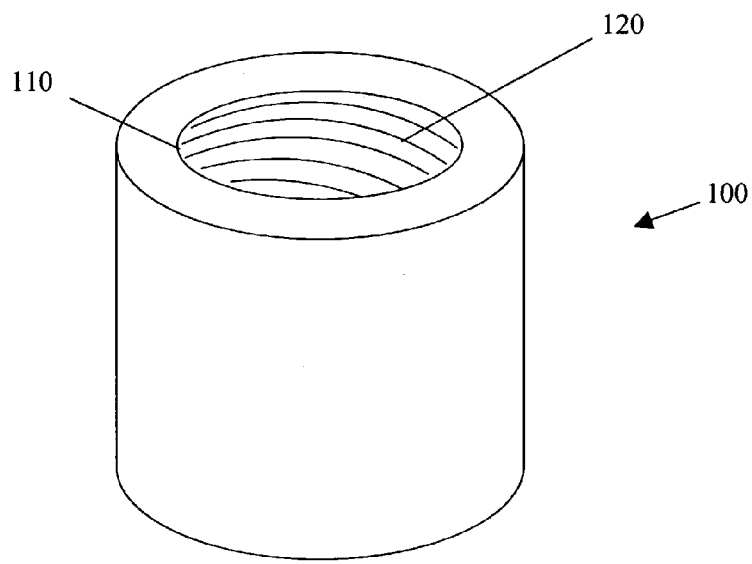
FIG. 1 shows a fuel cell casing in accordance with various embodiments of the invention.
Figure 2:
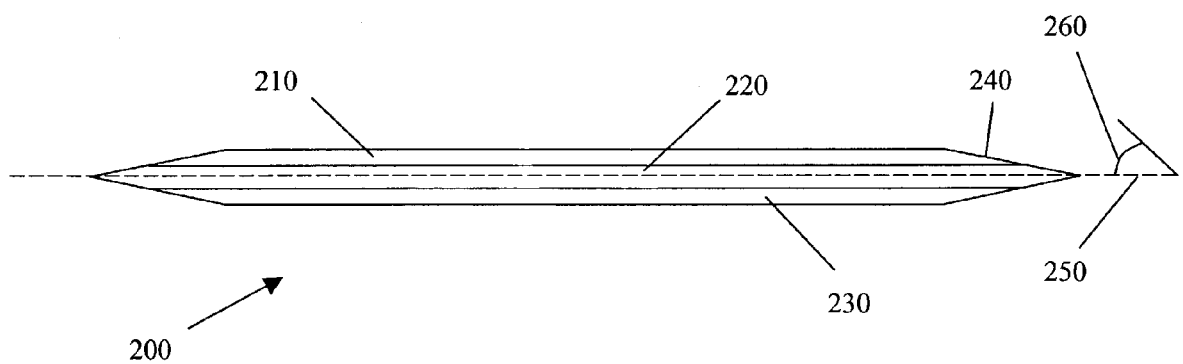
FIG. 2 shows a side view of a fuel cell element usable in connection with the casing of FIG. 1.

FIG. 1 shows one embodiment of a fuel cell casing 100. The casing 100 may be generally cylindrical and may have a borehole 110 as shown. The borehole 110 may an inner surface having a spiral groove or thread 120. The fuel cell casing 100 may comprise at least one opening for threadably inserting one or more fuel cell elements (FIG. 2). The threaded portion 120 of the fuel cell casing 100 may or may not be threaded completely through borehole 110. A dummy element may be added at the top and/or bottom of the cylinder to enclose the system. A dummy element may serve to cap an end of the threaded casing, i.e., form the ends of the fuel cell stack. Accordingly, a dummy element would screw into the cylinder just as the fuel cell elements do.

The fuel cell casing 100 may be comprised of any suitable material having the appropriate properties as desired and/or necessitated for a particular end use. Some properties that may be considered may include, but are not limited to, thermal coefficients of expansion, chemical reactivity, conductivity properties, physical properties, the ability to create a threaded region in the material for receiving a fuel cell element, and durability over the anticipated operating temperature range of the fuel cell system (typically a fuel cell operating thermal cycle may range from room temperature to approximately 1000° C.). One skilled in the art will understand and appreciate that the casing materials should be carefully chosen in order to obtain the proper thermal coefficients of expansion that enable proper sealing between fuel cell elements and casing. Suitable materials may include, but are not limited to, ceramics, such as alumina and the like. In general, the fuel cell casing should not be an electron conductor. However, if an electron conductor is used it should be coated with an insulating material.

The configuration of the threads 120 of the fuel cell casing 100 may include any suitable shape that will allow a fuel cell element to be rotated along the axial direction of the borehole 110. For example, the threads may include tapered grooves or another shape including, without limitation square or rounded grooves. The shape of the threads is not critical to the invention provided that the depth of the thread allows continuous gas and liquid sealing with expansion/contraction of the fuel cell element. One of ordinary skill in the art will understand and appreciate the necessary depth and tolerance of the threads in order to maintain a seal with respect to the thermal expansion of the fuel cell components, i.e., casing and elements.

FIG. 2 shows a side view of a planar fuel cell element 200. It will be appreciated that planar does not indicate smooth, but includes rough and/or textured surfaces. Fuel cell element 200 may be comprised of electrode and electrolyte material. A single fuel cell element may contain anodic and/or cathodic materials as the electrode material. It will be appreciated by those of ordinary skill in the art that the fuel cell elements may be configured in a number of ways as desired and/or necessitated by the particular use or operating conditions to be used. For example, the fuel cell element may be electrolyte or electrode supported. In an electrode supported configuration (not shown), either the anode or cathode material acts as the support and the other components and deposited as thin layers on the support. In an electrolyte support, the electrolyte material acts and the support and the anode and cathode materials are deposited as layers on the electrolyte. In one embodiment (not shown), an anode supported fuel cell element may enhance sealing by oxidizing and "swelling" into the threaded groove of the casing as it reacts with an oxidant.

As shown in FIG. 2, fuel cell element 200 is configured as an electrolyte supported element and comprises anode material 210, electrolyte material 220 and cathode material 230. In general, the fuel cell element 200 enables the primary reactions of the fuel cell to take place. The primary reaction involves the transportation of oxygen ions through the electrolyte 220 from the cathode material 230 to the anode material 210. As fuel (usually hydrogen $H_2$ or methane $CH_4$) arrives at the anode 210, the fuel may react with oxygen ions from the electrolyte 220, forming, inter alia, water and releasing electrons (e-) to an external circuit.

It will be appreciated that the particular electrolyte material used in the embodiments of the invention is not critical to the spirit of the invention. The electrolyte material may be formed from any suitable material, as desired and/or necessitated by a particular end use. Suitable electrolyte materials may include, but are not limited to, yttria-stabilized zirconia (YSZ), samarium doped-ceria (SDC, $Ce_xSm_yO_{2-\delta}$), gadolinium doped-ceria (GDC, $Ce_xGd_yO_{2-\delta}$), $La_aSr_bGa_cMg_dO_{3-\delta}$ and mixtures thereof.

Likewise, the electrode material used in the embodiments of the invention is not critical to the spirit of the invention. The electrode material may be formed from any suitable material, as desired and/or necessitated by a particular end use. In general, the electrode materials may be comprised of metal(s), ceramic(s) and/or cermet(s). It will be appreciated that the electrode materials may comprise either anodic or cathodic materials. Examples of suitable anodic materials include, but are not limited to, Ni—YSZ, Cu—YSZ, Ni—SDC, Ni—GDC, Cu—SDC, Cu—GDC and mixtures thereof. Examples of suitable cathodic materials include, but are not limited to, samarium strontium cobalt oxide (SSCO, $Sm_xSr_yCoO_{3-\delta}$), barium lanthanum cobalt oxide (BLCO, $Ba_xLa_yCoO_{3-\delta}$), gadolinium strontium cobalt oxide (GSCO, $Gd_xSr_yCoO_{3-67}$).

Referring still to FIG. 2, fuel cell element 200 is shown with a tapered edge 240. The shape of the tapered edge 240 generally corresponds to the shape of the thread 120 of the fuel cell casing 100. The tapered edge 240 allows the fuel cell element 200 to be threadably inserted or otherwise engaged into the threaded fuel cell casing 100. The angle of the tapered edge 240 may be about 10° or greater as measured from the centerline 250 of the planar element (shown as angle 260).

Figure 2A:
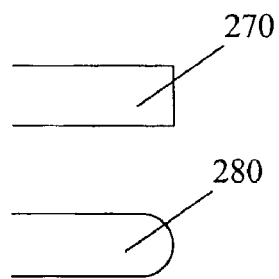
FIG. 2a shows a partial side view of the edges of fuel cell elements usable in connection with a threaded fuel cell casing.

The fuel cell element's outer edge 240 may have any desired shape, e.g., square 270, rounded 280 (shown in FIG. 2a), or combinations thereof, so that it can engage threads 120 of the casing. The shape of the threads is not critical to the invention provided that the shape corresponds to the threaded shape of the fuel cell casing. In an alternative embodiment, the outer edge of the fuel cell element may comprise an additional material useful for creating a gas and liquid seal in the threads of a fuel cell casing. Such additional material may include Ni or Cu for example. This material may be oxidized and reduced during various cycles of the fuel cell. As oxide growth occurs, the material will expand filling any available space in the thread. This could also be a self terminating process where the oxidation is limited where gas flow past the seal is terminated.

Figure 3:
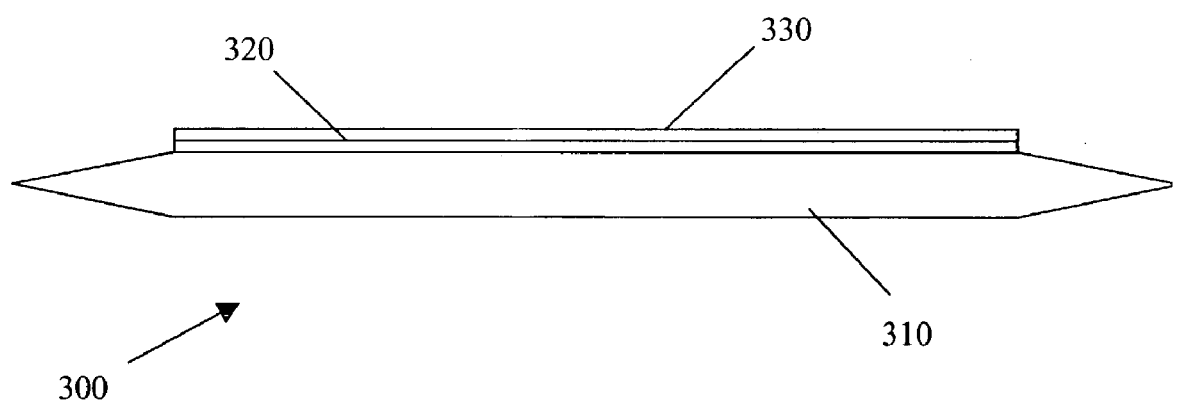
FIG. 3 shows a side view of a fuel cell element having an anode support structure.

The fuel cell elements may be prepared under standard fabrication methods. For example, an anode supported fuel cell element 300, as shown in FIG. 3, may be fabricated using a tape cast process or any other technique whereby a porous support anode layer 310 can be formed. A thin electrolyte layer 320 may then be deposited followed by a thin cathode layer 330. Current collectors (not shown) may also be deposited via PVD, screen printing or any other suitable technique. The shape of the element may be achieved while the fuel cell element is still in a "green" state. The tape cast material may be cut or stamped. After the green tape has been cut it may then sintered. Current collectors may then be patterned. The edge may be ground to form the desired outer shape, i.e., the thread, while the element is still in the green state or after sintering.

Figure 4:
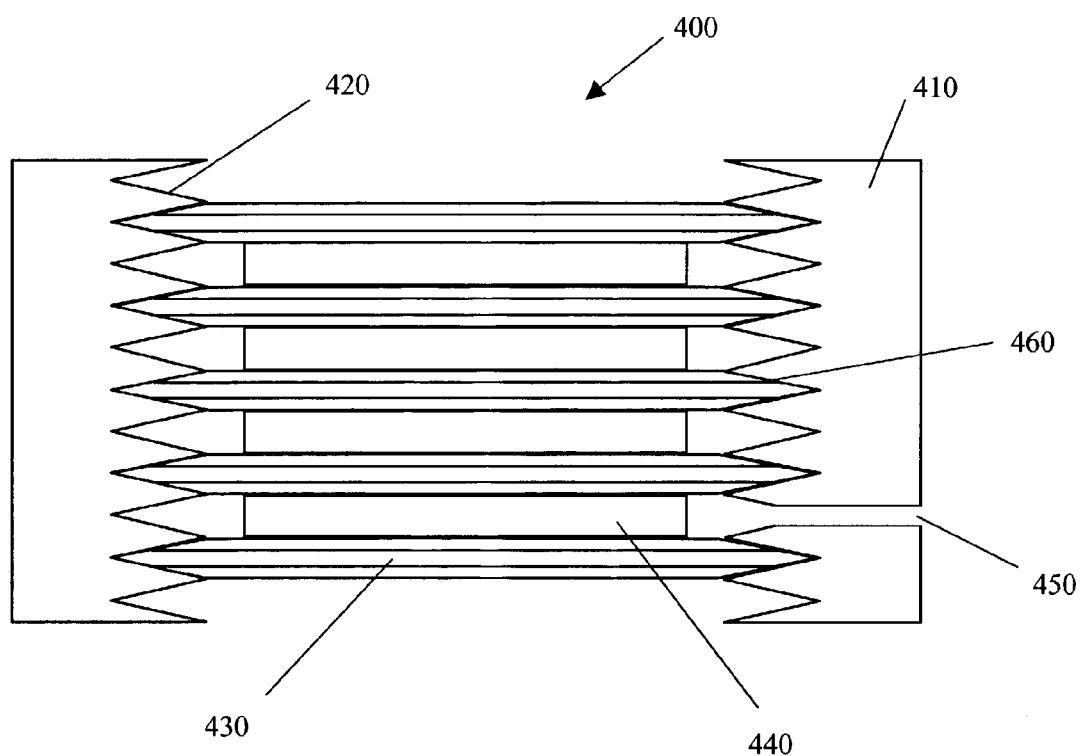
FIG. 4 shows an axial cross section of a fuel cell stack in accordance with various embodiments of the invention.

FIG. 4 shows, a cross of a fuel cell system 400 comprised of a fuel cell casing 410, fuel cell elements 430 and spacers 440. It should be appreciated that drawings are not intended to be in proper proportion, but are illustrated in a manner for clarity and ease of discussion. For example, the spacers 440 in some embodiments would ideally be as small as functionally possible, as will be described in more detail below. The casing 410 and elements 430 include the casing 100 and elements 200 as described above. The fuel cell elements 430 and spacers 440 form a fuel cell stack. Multiple ports 450 (only one shown) may be included for flow of gases and/or liquids through the casing 410 and in between fuel cell elements 430. The embodiments disclosed herein are not limited to fuel cell casing flow ports as shown in FIG. 4. Other mechanisms and designs are sufficient as an alternative or an addition to casing ports. Such alternatives include, but are not limited to channels, or other mechanisms for allowing the addition and/or removal of gas and/or liquid to come into contact with one or more areas of the fuel cell elements 430.

The spacers 440 are not critical to the invention but may be included as desired and/or necessary for a particular application. The spacers provide a mechanism for separating fuel cell elements and enabling electrical communication between. The spacers can be made of a ceramic material similar to the casing and then coated with Au or some other material that is chemically inert within the system, provides good electrical connection and does not exhibit fatigue problems, e.g., $LaSrCrO_3$, hastalloy or stainless steel. In one embodiment, the spacers may look like a standard washer that is warped (not shown) to give it some "spring" properties. If the ceramic spacer is thin enough (e.g., about 40 to about 1000 microns) it should maintain a spring constant that will reduce issues associated to thermal stress down the core. These spacers may be stacked in order to provide larger spacing and elastic movement. Other spacer configurations include fixed thick washers with grooves running radially outward from the center (not shown). This could provide a mechanism for gas movement through the center core. Likewise, the spacers 440 may be comprised of any suitable material having the appropriate properties as desired and/or necessary for a particular application.

The fuel cell elements 430 have edges 460 that correspond in shape to the shape of the threads 420 of the fuel cell casing 410. In one embodiment an edge of a single fuel cell element 430 may form a single thread. It will be appreciated by one of ordinary skill in the art that other configurations, including, for example, multiple threads are equally applicable.

One embodiment of the invention may comprise a method for assembling a fuel cell stack having one or more fuel cell elements, a fuel cell casing and optionally one or more spacers. The fuel cell casing may have threads for receiving the fuel cell elements and the fuel cell elements may have an outer edge that forms one or more threads corresponding to the threads of the fuel cell casing. The method may comprise threading or rotating one or more fuel cell elements into the fuel cell casing via mechanical or manual processes. The element may be rotated to a desired depth within the fuel cell casing and may be aligned with preexisting flow ports and/or other internal design features. Precise placement of the fuel cell elements facilitated by use of computer controlled mechanics including robotics.

Lubricants may be used to prevent binding of the fuel cell elements and aid in placing the fuel cell elements. In addition, the high thermal cycling temperatures of the operating fuel cell system may bake the lubricant into the interfacial regions between the fuel cell element edges and the fuel cell casing threads. In this manner, the lubricants may also help seal the fuel cell elements in the fuel cell casing threads.

In one embodiment, the lubricants may be put into threads and not on fuel cell element, helping to reduce the potential for binding during assembly. The lubricants may also be burned out after assembly. Suitable lubricants include but are not limited to, $ZrO_2$, $Al_2O_3$ and MgO powders or powder sheets, such as Setter Powder Sheets™ or Ceramic Powder Liners™ available commercially by Harmonics, Incorporated.

The above discussion is meant to be illustrative of the principles and various embodiments of the present invention. Numerous variations and modifications will become apparent to those skilled in the art once the above disclosure is fully appreciated. For example, although the fuel cell casing in FIG. 1 is illustrated as cylindrical, the shape of the casing is not critical to the invention and any suitable shape is acceptable. In addition, the casing may not be a unitary structure, but may be comprised of multiple pieces that form the threaded casing. It is intended that the following claims be interpreted to embrace all such variations and modifications.

What is claimed is:

1. A fuel cell assembly, comprising:
   a threaded casing; and
   one or more fuel cell elements comprising electrode and electrolyte material;
   wherein the fuel cell elements are threadingly engaged in the threaded casing; and
   wherein each fuel cell element has an outer edge that engages the threads of the threaded casing.

2. The assembly according to claim 1 wherein the outer edge comprises an additional sealing material.

3. The assembly according to claim 2 wherein the sealing material is selected from the group consisting of Ni and Cu.

4. The assembly according to claim 1 wherein the outer edge of the fuel cell elements have a square edge.

5. The assembly according to claim 1 wherein the outer edge of the fuel cell elements have a rounded edge.

6. The assembly according to claim 1 further comprising a spacer between adjacent fuel cell elements.

7. The assembly according to claim 1 further comprising gas ports in the fuel cell casing.

8. The assembly according to claim 1 wherein the threads of the fuel cell casing comprise square grooves.

9. The assembly according to claim 1 wherein the threads of the fuel cell casing comprise rounded grooves.

10. The assembly according to claim 1 wherein the fuel cell elements are electrolyte supported.

11. The assembly according to claim 1 wherein the fuel cell elements are electrode supported.

12. The assembly according to claim 1 wherein the fuel cell element is anode supported and the swelling of the anode during operation enhances sealing in the threads.

13. An assembly, comprising:
    a means for supporting electrode materials; and
    a means for threadingly engaging the electrode materials to form a fuel cell stack.

14. The assembly according to claim 13 wherein the electrode materials include both anode and cathode material separated by a solid electrolyte material.

15. The assembly according to claim 13 wherein the electrode materials include both anode and cathode material and either the anode or cathode material acts as the support for the other electrode material and an electrolyte material.

16. The assembly according to claim 13 wherein the means for supporting electrode materials comprises an anode supported fuel cell element and the anode material swells to enhance sealing during operation of the assembly.

17. A method for making a fuel cell comprising the steps of rotating a fuel cell element into a threaded fuel cell casing and using a lubricant to prevent binding during rotation of the fuel cell elements.

18. The method according to claim 17 further comprising placing one or more spacers between adjacent fuel cell elements.

19. The method according to claim 17 wherein the lubricant is placed into, the threads of the threaded fuel cell casing.

20. The method according to claim 17 wherein the lubricant bakes into the threads during operation of the fuel cell to enhance sealing of the fuel cell element.

21. The method according to claim 17 wherein the lubricant burns out during operation of the fuel cell.

22. A fuel cell element comprising a planar disc having at least one electrode layer and an electrolyte layer and wherein the outer edge of the disc is adapted to engage a threaded inner surface of a fuel cell casing.

23. The fuel cell element according to claim 22 wherein the fuel cell element comprises an anode layer on one side and a cathode layer on the other side of the planar electrolyte layer.

24. The fuel cell element according to claim 22 wherein the fuel cell element comprises an anode support layer having an electrolyte layer and a cathode layer deposited thereon.

* * * * *